May 13, 1952 L. WULFF 2,596,457
METHOD OF FORMING FISHING LURES, FLIES, NYMPHS, AND THE PRODUCT
Filed May 10, 1951
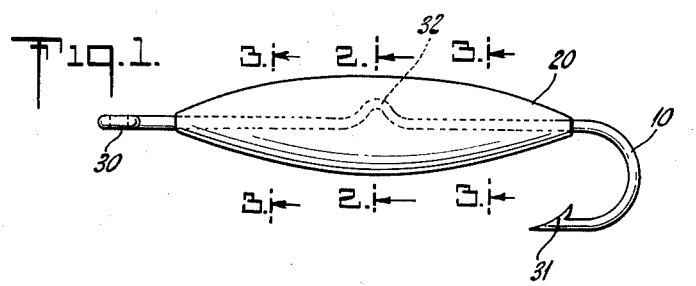
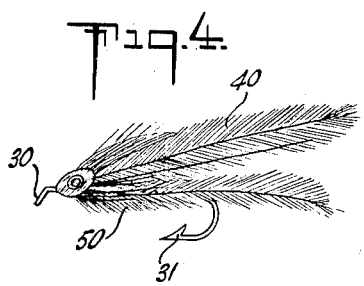
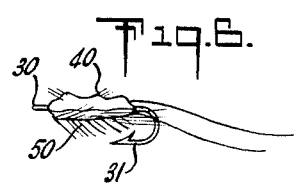
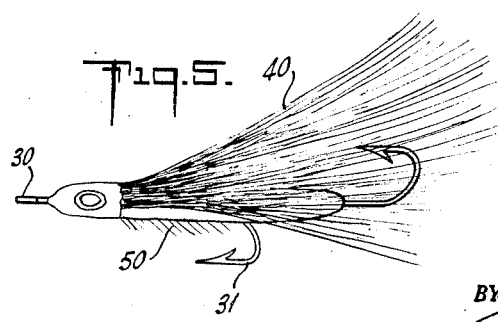
INVENTOR.
LEE WULFF
BY
ATTORNEY Patented May 13, 1952

2,596,457

UNITED STATES PATENT OFFICE 2,596,457

METHOD OF FORMING FISHING LURES, FLIES, NYMPHS, AND THE PRODUCT

Lee Wulff, Shushan, N. Y.

Application May 10, 1951, Serial No. 225,637

5 Claims. (Cl. 43—42.53)

This application is a continuation in part of my two previously filed applications Serial Number 91,936, filed May 7, 1949, and Serial Number 125,293, filed November 3, 1949, both now abandoned.

My invention relates to fishing flies, lures and nymphs and the like and has for its object the production of a simple method of making lures that will permit any angler, if he so desires, to create an exact imitation of the correct insect preferred by the fish sought at the time and place of fishing.

Heretofore lures have been constructed by tying the wing and leg material to the shank of the hook between the eye and wing by winding a thread around the shank, embracing and holding the lure material to the hook. The tying of the knot was trying and exacting and required the skill of an artisan seldom found in an angler. With the present method a plastic is applied to the hook shank between the eye and the wing and shaped as it hardens to define a fly body, feathers to define wings and material to define legs are dipped on their ends into liquid plastic, like that which forms the body and placed against the body securing the feathers and the lure material within the surface of the body in an integrated whole. This embraces the wing and leg material within the body so that they cannot be pulled off.

I may use a solvent for dipping the ends of the lure material. This solvent softens the body plastic enabling the tack material to be embraced within the body material.

The invention is to provide a method of securing the wing and leg material within the body structure so that the ends of the lure material will be confined within the plastic of the body not merely adhering to the surface thereof.

A further object is to provide a specially shaped body as a base for the wing and leg material so that they may be applied without bulking the cross-section beyond the natural shape of the lure which is being imitated. In order to provide such a structure, the body should have two substantially plane surfaces angularly disposed to a third surface, to permit the application of the feathers, hair or other lure material in natural wing position for insect imitation while the base or third side may be used for attaching leg material and in the case of a dry fly sufficient leg material to float the fly.

Much experimentation has been done by others in the attempt to do away with the disadvantages in the use of thread and knot tying, by hot molding material to the hooks but such operations require special machinery, mechanical control and other special devices and tools. With my method the plastic is formed on the shank of the hook between the eye and barbed point and while hardening it is shaped as desired.

The end of the lure material is then dipped into a solvent and a plastic like that of which the body is formed and applied in position, the plastic contained on the ends of the lure material becoming an integral part of the body due to the softening of the plastic of the body by the solvent and the lure material being held within a unitary mass and quite impossible to be separated therefrom after hardening of the plastic.

An object of this invention is to provide a simple method of making lures that overcomes all the above difficulties experienced with present day methods.

The foregoing and other features of my invention will now be described in connection with the accompanying drawing forming part of this specification in which I have illustrated my invention in its preferred form after which I shall point out in the claims those features which I believe to be new and of my own invention.

In the drawings:

Figure 1 is a side view of my lure body.

Figure 2 is a cross-section along the line 2—2, Figure 1.

Figure 3 is a cross-section along the lines 3—3, Figure 1.

Figure 4 is a side view of a lure, used as a minnow imitation and known as a streamer.

Figure 5 is a side view of a lure, a salt water streamer for bone fish, stripers and/or tarpon.

Figure 6 is a side view of a dry fly having a plurality of legs to float the fly.

In the carrying out of my invention I use a fish hook 10 having an eye 30, barbed point 31, hump 32, formed substantially between the eye and the curve of the shank. The body 20 is formed of plastic either molded or it may be formed by hand, as will be readily understood.

Any type of lure may be formed on this body member by applying the wing material 40 to the side surface and the leg 50 material to the base surface of the body member.

In Figure 4, I illustrate a completed streamer. To form this, the wing material 40 is selected to give desired effect, the ends of the feathers or other lure material being dipped in substantially the same plastic from which the body 20 is made and by the use of the solvent positioned on the body as shown. The plastic on the wing unites with the body plastic forming a unitary whole embedding and securing the wing material within the plastic. Plastic of different colors may then be applied to give desired life-like appearance to the lure as shown.

In Figure 5, I illustrate a completed streamer which may be used for bone fish, stripers and/or tarpon. In this lure I prefer to use a hook with two barbed end portions 31 as shown. The method used in forming this lure is the same as described above, the only difference is the selection of and application of the feather material.

In Figure 6, I illustrate a dry fly with legs provided to float the lure. The ends of the leg material are embedded in the plastic of the body in the same way. The ends of the hair 50 are dipped into liquid plastic and solvent and positioned on the body which unites with the material body in a uniform mass securing the legs within the body.

It will be observed that in the basic body illustrated this feature is found and that is one of the important parts of this invention. The body 20 is formed or molded around the shank 32 of the hook 10 having at least three slightly curved sides disposed around the shank, two sides in angular relation with the third side.

To facilitate application of feathers to imitate minnows, nymphs and other food of game fish, the substantial triangular form shown in Figures 1, 2 and 3 with the apex at the top allows for leg or fin material to be applied to the base while the wing material can be applied to the two sides, thus presenting true or life-like impression to the game fish.

The two sides angularly disposed to a third side permits application of feather, hair or other lure material in natural wing position for insect imitation, while the base or third side may be used for attaching leg material and in the case of dry fly sufficient leg material to float the fly. With this fundamental shape the lure material may be attached without bulking the finished product beyond the natural shape of the bug imitated.

I wish it distinctly understood that my method for forming lures herein illustrated and described shows the steps performed in carrying out my method and the lures and flies and the product of said process, all are shown and described in the various forms in which I desire to construct them, and that changes or variations may be made as may be desirable or convenient without departing from the salient features of my invention and I therefore intend the following claims to cover such modifications as naturally fall within the lines of invention.

In the claims:

1. A method of making a fly which consists of providing a hook having a shank, an eye and a barbed point, applying a plastic to the hook shank between the eye and the wing, shaping the plastic while it hardens to define a fly body substantially triangular cross-section, applying lure material to define wings and material to define legs to the body and adhering said feathers and material for the legs in the surface of the body by the same material that forms the body and while using a solvent to soften the plastic of the body.

2. A method of making a fly which consists of providing a hook having a shank, an eye and barbed point connected by a shank, applying a plastic to the hook shank between the eye and wing, shaping the plastic while it hardens to define a fly body having a triangular transverse cross-section, applying feathers to define wings and material to define legs to the body and adhering said feathers and material for wings and legs in the surface of the body, applying a solvent to soften the body and penetrate the porosity of the body whereby the wing and leg material are tightly held in the material of the body in a unit mass when hardened.

3. A method of making a fly which consists of providing a hook having an eye and barbed point connected by a shank, applying a plastic body being substantially triangular in transverse cross-section to the hook shank between the eye and wing, shaping the plastic while it hardens to define a fly body, applying a solvent to soften the body to receive the said wing and leg material within the body and harden into a unified mass with the wing and leg material held within the body material.

4. A lure body for a fishing fly, in combination a fish hook having an eye, barbed point and connecting shank, a plastic body member in hardened condition on the shank between the eye and the barbed point, said body being substantially triangular in transverse cross-section provided with three slightly curved surfaces disposed around the shank, two of the surfaces in angular relation with the third surface, the largest area of the cross-section being located substantially in the center of the elongated body and gradually diminishing in size as it approaches each end and lure material defining wings and legs in adhering condition within the body, said plastic causing such adherence.

5. A lure comprising a hook having a shank, an eye and barbed point, a plastic body being substantially triangular in transverse cross-section formed on the shank between the eye and the barbed point, feathers defining wings and material to define legs embodied within the body surface material in adhering condition said plastic causing such adherence.

LEE WULFF.

REFERENCES CITED

The following references are of record in the file of this patent:

UNITED STATES PATENTS

| Number | Name | Date |
| --- | --- | --- |
| 1,557,083 | Peckinpaugh | Oct. 13, 1925 |
| 2,018,622 | Davenport | Oct. 22, 1935 |
| 2,148,799 | Bilinski | Feb. 28, 1939 |
| 2,518,487 | Metz | Aug. 15, 1950 |